US012609944B1

(12) United States Patent
Chang

(10) Patent No.: US 12,609,944 B1
(45) Date of Patent: Apr. 21, 2026

(54) DATA LINEAGE-BASED ANOMALY DETECTION

(71) Applicant: Trend Micro Incorporated, Tokyo (JP)

(72) Inventor: Sheng-Che Chang, Ottawa (CA)

(73) Assignee: Trend Micro Incorporated, Tokyo (JP)

( * ) Notice: Subject to any disclaimer, the term of this patent is extended or adjusted under 35 U.S.C. 154(b) by 16 days.

(21) Appl. No.: 18/911,000

(22) Filed: Oct. 9, 2024

(51) Int. Cl.
　　*G06F 21/60* (2013.01)
　　*H04L 9/40* (2022.01)
(52) U.S. Cl.
　　CPC .......... *H04L 63/1416* (2013.01); *G06F 21/60* (2013.01)
(58) Field of Classification Search
　　None
　　See application file for complete search history.

(56) References Cited

U.S. PATENT DOCUMENTS

| | | | | |
|---|---|---|---|---|
| 8,499,152 | B1 * | 7/2013 | Chen | H04L 63/20 |
| | | | | 713/165 |
| 9,112,895 | B1 * | 8/2015 | Lin | H04L 63/1425 |
| 10,162,967 | B1 * | 12/2018 | Oliver | H04L 63/145 |
| 11,349,855 | B1 * | 5/2022 | Amit | G06F 9/547 |
| 11,487,876 | B1 * | 11/2022 | Pryde | G06F 21/56 |
| 11,494,618 | B2 * | 11/2022 | Xia | G06N 3/045 |
| 11,886,586 | B1 * | 1/2024 | Chang | G06F 21/566 |
| 12,170,685 | B2 * | 12/2024 | Manor | H04L 63/1416 |
| 12,506,757 | B2 * | 12/2025 | Allouche | H04L 63/1425 |
| 2018/0063182 | A1 * | 3/2018 | Jones | H04L 63/1433 |
| 2018/0211039 | A1 * | 7/2018 | Tamir | G06F 21/568 |
| 2018/0234234 | A1 * | 8/2018 | Hurley | G06F 21/64 |
| 2019/0207969 | A1 * | 7/2019 | Brown | G06F 21/552 |
| 2022/0207141 | A1 * | 6/2022 | Chung | G06F 18/22 |
| 2024/0152622 | A1 * | 5/2024 | Xia | G06F 21/552 |
| 2024/0211599 | A1 * | 6/2024 | Koo | G06F 21/568 |

(Continued)

FOREIGN PATENT DOCUMENTS

CN 　　　　106599686 B 　　6/2019

OTHER PUBLICATIONS

"Trend Vision One Search and Observed Attack Technique (Apr. 2023)", Trend Micro, https://success.trendmicro.com/en-US/solutionlka-0014382, Last updated Apr. 26, 2023.

(Continued)

*Primary Examiner* — Khang Do
(74) *Attorney, Agent, or Firm* — Beyer Law Group LLP

(57) ABSTRACT

Disclosed are a system and methods for detecting anomalies in a computer network. Files that are stored in the computer network of an organization are enumerated. The locality-sensitive hash values of the enumerated files are calculated. Sensitive files among the enumerated files are identified based on the locality-sensitive hash values of the enumerated files. Similarity between identified sensitive files is determined based on their distance from each other. The identified sensitive files are linked on a timeline based on their similarity and creation time. One or more event filters are applied to the timeline to detect anomalous file events. Files on the timeline that are involved in the anomalous file events and users that operated on the files are flagged. Mitigation is performed on the flagged files and users.

12 Claims, 22 Drawing Sheets

(56)     References Cited

U.S. PATENT DOCUMENTS

2025/0227116 A1* 7/2025 Paul ...................... H04L 63/145
2026/0006067 A1* 1/2026 Hittel ................... H04L 63/145

OTHER PUBLICATIONS

"Trend Vision One, Integrated Attack Surface Management (ASM) and Extended Detection and Response (XDR), Solution Brief", 2024.
"TLSH—A Locality Sensitive Hash", Trend Micro, https://tlsh.org/index.html, Last Updated Nov. 26, 2021.

* cited by examiner

200

|  | d1 | d2 | d3 | d4 | d5 | d6 | d7 | d8 | d9 | d10 | s1 |
|-----|-----|-----|-----|-----|-----|-----|-----|-----|-----|-----|-----|
| d1 | ✳ | ✳ | ✳ | ✳ | ✳ | ✳ | ✳ | ✳ | ✳ | ✳ | 0 |
| d2 | ✳ | ✳ | ✳ | ✳ | ✳ | ✳ | ✳ | ✳ | ✳ | ✳ | ✳ |
| d3 | ✳ | ✳ | ✳ | ✳ | ✳ | ✳ | ✳ | ✳ | ✳ | ✳ | 50 |
| d4 | ✳ | ✳ | ✳ | ✳ | ✳ | ✳ | ✳ | ✳ | ✳ | ✳ | ✳ |
| d5 | ✳ | ✳ | ✳ | ✳ | ✳ | ✳ | ✳ | ✳ | ✳ | ✳ | ✳ |
| d6 | ✳ | ✳ | ✳ | ✳ | ✳ | ✳ | ✳ | ✳ | ✳ | ✳ | ✳ |
| d7 | ✳ | ✳ | ✳ | ✳ | ✳ | ✳ | ✳ | ✳ | ✳ | ✳ | ✳ |
| d8 | ✳ | ✳ | ✳ | ✳ | ✳ | ✳ | ✳ | ✳ | ✳ | ✳ | 50 |
| d9 | ✳ | ✳ | ✳ | ✳ | ✳ | ✳ | ✳ | ✳ | ✳ | ✳ | 50 |
| d10 | ✳ | ✳ | ✳ | ✳ | ✳ | ✳ | ✳ | ✳ | ✳ | ✳ | 50 |
| s1 | 0 | ✳ | 50 | ✳ | ✳ | ✳ | ✳ | 50 | 50 | 50 | ✳ |

|      | d1  | d3  | d8  | d9  | d10 |
|------|-----|-----|-----|-----|-----|
| d1   | ✳   | 50  | 50  | 50  | 50  |
| d3   | 50  | ✳   | 0   | 0   | 0   |
| d8   | 50  | 0   | ✳   | 0   | 0   |
| d9   | 50  | 0   | 0   | ✳   | 0   |
| d10  | 50  | 0   | 0   | 0   | ✳   |

|     | d1  | d3  | d8  | d9  | d10 | d1A |
|-----|-----|-----|-----|-----|-----|-----|
| d1  | ✳   | 50  | 50  | 50  | 50  | 20  |
| d3  | 50  | ✳   | 0   | 0   | 0   | 70  |
| d8  | 50  | 0   | ✳   | 0   | 0   | 70  |
| d9  | 50  | 0   | 0   | ✳   | 0   | 70  |
| d10 | 50  | 0   | 0   | 0   | ✳   | 70  |
| d1A | 20  | 70  | 70  | 70  | 70  | ✳   |

|      | d1 | d3 | d8 | d9 | d10 | d1B |
|------|----|----|----|----|-----|-----|
| d1   | ✳  | 50 | 50 | 50 | 50  | 50  |
| d3   | 50 | ✳  | 0  | 0  | 0   | 0   |
| d8   | 50 | 0  | ✳  | 0  | 0   | 0   |
| d9   | 50 | 0  | 0  | ✳  | 0   | 0   |
| d10  | 50 | 0  | 0  | 0  | ✳   | 0   |
| d1B  | 50 | 0  | 0  | 0  | 0   | ✳   |

FIG. 11

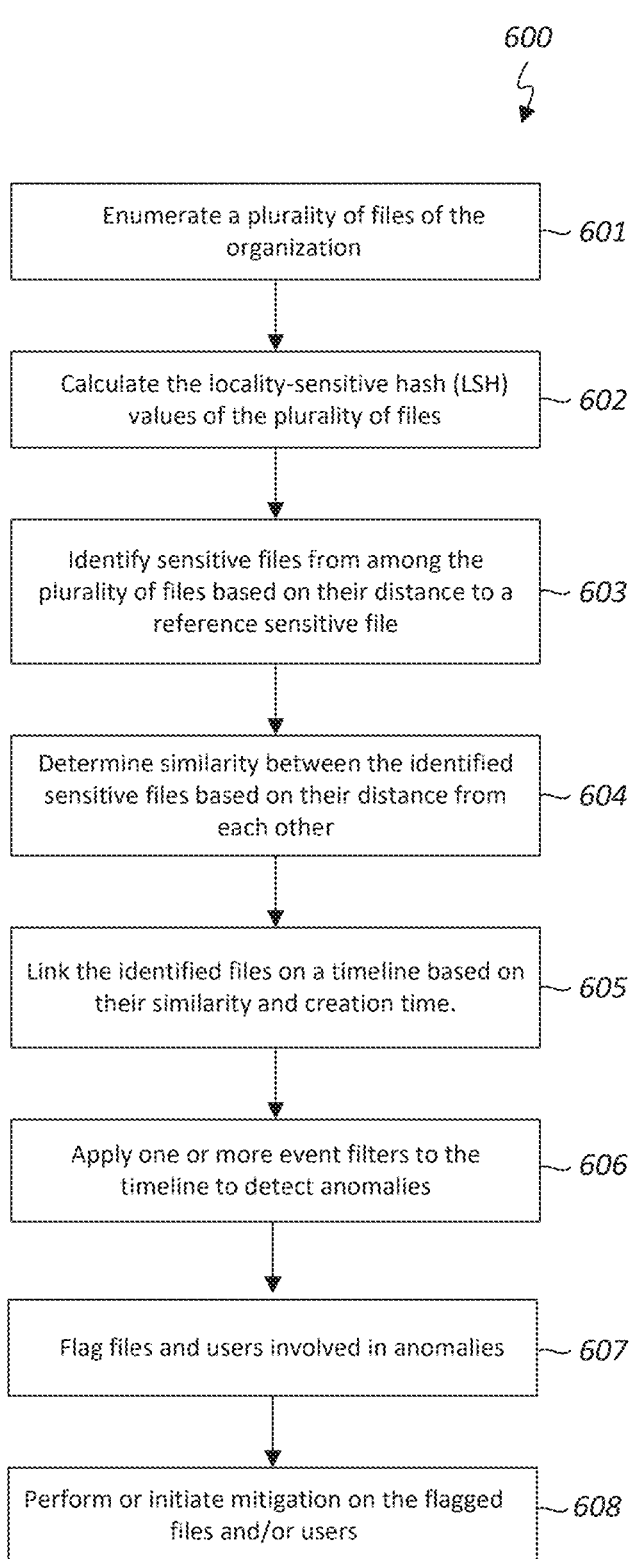

*600*

Enumerate a plurality of files of the organization — *601*

Calculate the locality-sensitive hash (LSH) values of the plurality of files — *602*

Identify sensitive files from among the plurality of files based on their distance to a reference sensitive file — *603*

Determine similarity between the identified sensitive files based on their distance from each other — *604*

Link the identified files on a timeline based on their similarity and creation time. — *605*

Apply one or more event filters to the timeline to detect anomalies — *606*

Flag files and users involved in anomalies — *607*

Perform or initiate mitigation on the flagged files and/or users — *608*

FIG. 21

DATA LINEAGE-BASED ANOMALY DETECTION

TECHNICAL FIELD

The present disclosure is directed to cybersecurity.

BACKGROUND

A vast amount of data exists and operates within an enterprise network to support business activities. This data includes sensitive data as well as general business data. Some of it is duplicated, and some is redundant. Different types of data require distinct management strategies, with sensitive data demanding heightened security and attention. If users do not follow proper practices for labeling and managing sensitive data, and carelessly store it across the enterprise network, vulnerabilities are created. Both external attackers and internal threats could easily access this data, exposing the organization to significant and unexpected risks.

BRIEF SUMMARY

Disclosed are system and methods for detecting anomalies in a computer network. In one embodiment, files that are stored in a computer network of an organization are enumerated. The locality-sensitive hash values of the enumerated files are calculated. Sensitive files among the enumerated files are identified based on the locality-sensitive hash values of the enumerated files. Similarity between identified sensitive files is determined based on their distance from each other. Identified sensitive files are linked on a timeline based on their similarity and creation time. One or more event filters are applied to the timeline to detect anomalous file events. Files on the timeline that are involved in the anomalous file events and users that operated on the files are flagged. Mitigation is performed on the flagged files and users.

These and other features of the present disclosure will be readily apparent to persons of ordinary skill in the art upon reading the entirety of this disclosure, which includes the accompanying drawings and claims.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 4 shows a distance matrix, in accordance with an embodiment of the present invention.

FIG. 6 shows a distance matrix, in accordance with an embodiment of the present invention.

FIG. 9 shows a distance matrix, in accordance with an embodiment of the present invention.

FIG. 11 shows a distance matrix, in accordance with an embodiment of the present invention.

FIG. 21 shows a flow chart of a method of detecting anomalies, in accordance with an embodiment of the present invention.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
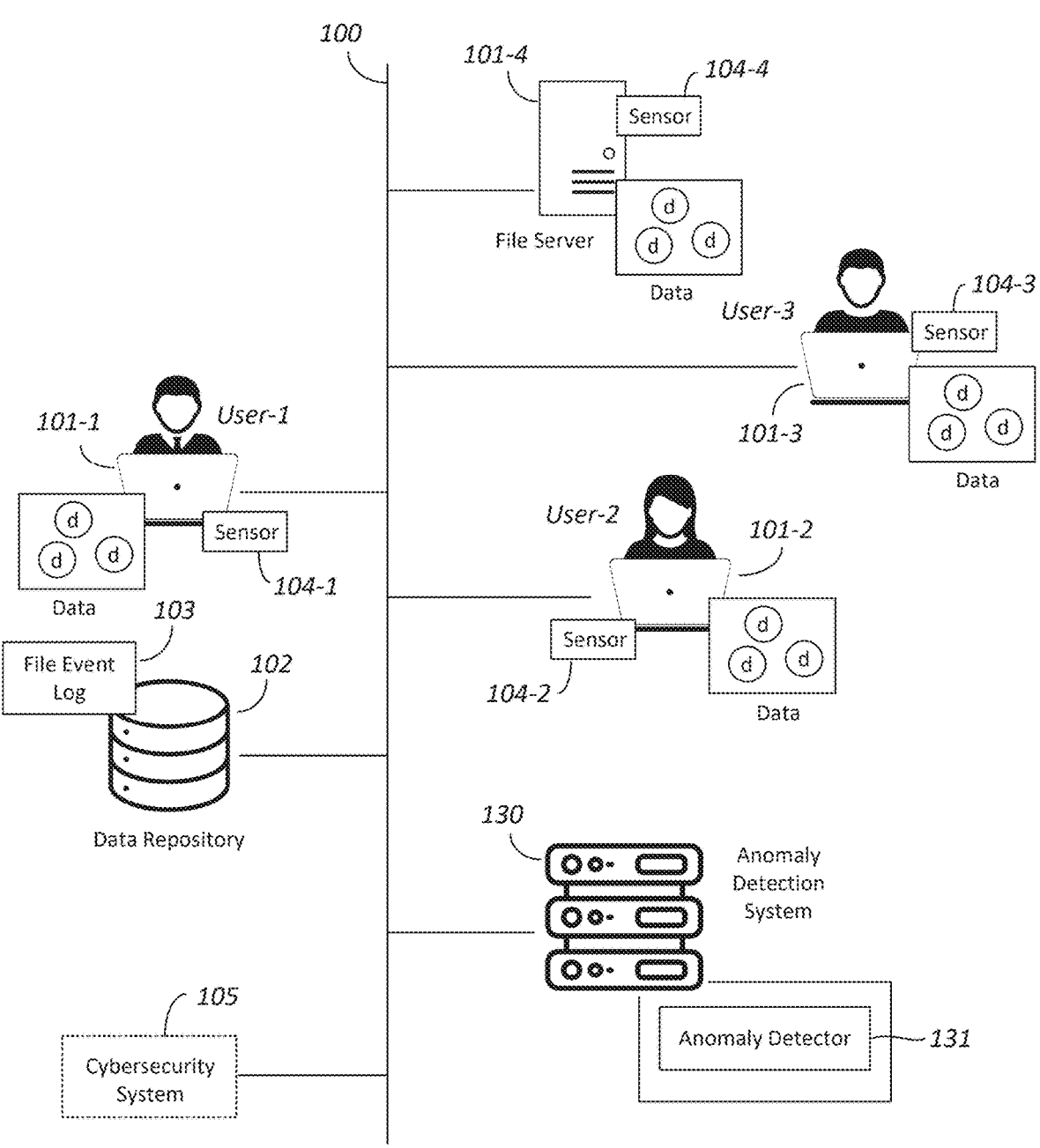
FIG. 1 shows a block diagram of an enterprise network, in accordance with an embodiment of the present invention.

FIG. 1 shows a block diagram of an enterprise network 100, in accordance with an embodiment of the present invention. The enterprise network 100 may be a wide area network (WAN), a local area network (LAN), or another type of computer network. The enterprise network 100 is the computer network of an organization, such as a business, government, educational institution, or similar entity. The organization has a plurality of users (i.e., user-1, user-2, user-3, etc.), such as employees or members of the organization. Connected to the enterprise network 100 is a plurality of computer systems 101 (e.g., 101-1, 101-2, 101-3, etc.), which may be user computers, file servers, database servers, or other types of computer systems. Files containing data of the enterprise network 100, illustrated as a circled "d," may be stored in user computers (e.g., computer systems 101-1, 101-2, 101-3), file servers (e.g., computer system 101-4), and other computer systems that are part of the enterprise network 100.

The enterprise network 100 includes a commercially-available cybersecurity system 105 that is designed to protect the network from various types of cyberattacks, such as phishing, ransomware, intrusion, and malware infection. The cybersecurity system 105, which is schematically depicted as a dashed box, may be deployed across the enterprise network 100 and include gateways, security appliances, etc. While the cybersecurity system 105 can generally detect cyberattacks, detecting cyberattacks that involve sensitive data within the enterprise network 100 is relatively difficult due to the vast amount of data in the network. Additionally, identifying the specific files and users involved in such cyberattacks is challenging, further complicating mitigation procedures. As will be more apparent below, the cybersecurity system 105 may be augmented with an anomaly detector to detect anomalies involving sensitive data.

The cybersecurity system 105 includes endpoint sensors 104 (e.g., 104-1, 104-2, 104-3, etc.), which are software components that monitor computer operations performed on corresponding computer systems 101. These monitored operations include file operations, such as file creation, file read, file write, file deletion, file copying, and other operations involving a file. In response to detecting a file operation, an endpoint sensor 104 records a corresponding event in a file event log 103 that resides in a data repository 102. An event includes metadata related to the file operation, such as filename, file path, file action (e.g., creation, access, replication, movement, wiping, and modification), file owner, and file creation time.

An anomaly detection system 130 may comprise a computer system with at least one processor that executes instructions of an anomaly detector 131. The anomaly detection system 130 may be implemented on a dedicated server, interconnected servers, cloud computing platform (e.g., Amazon Web Services (AWS)™), or other suitable computer system. In one embodiment, the anomaly detector 131 is configured to enumerate files of the enterprise network 100, identify files containing sensitive data within the enumerated files, establish the lineage of the identified files, and apply one or more event filters on the established lineage to identify anomalous events, which are events that are indicative of cyberattacks. In one embodiment, the lineage of files comprises a timeline that links files containing the same (i.e., identical) or similar data by file creation time.

An example anomaly detection is now explained with reference to FIGS. 2-20. The example anomaly detection may be performed by the anomaly detection system 130, as programed with the anomaly detector 131. The example anomaly detection is explained in a series of steps, which are referred to as first through fifth anomaly detection steps.

Figure 2:
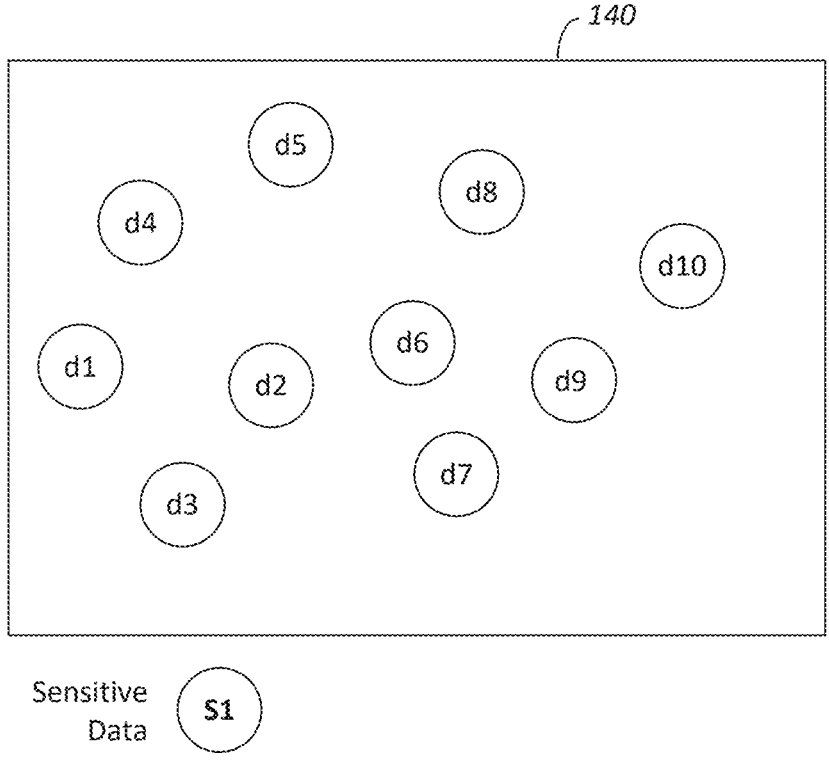
FIG. 2 schematically illustrates a collection of data objects of the enterprise network of FIG. 1, in accordance with an embodiment of the present invention.

Referring first to FIG. 2, there is schematically illustrated a collection 140 of data objects, labeled d1, d2, d3, etc., of the enterprise network 100. In one embodiment, the collection 140 comprises enumerated files of the enterprise network 100. More particularly, each of the data objects is embodied as a file stored in a computer system 101, and is identified in the event log 103 as having been operated by a user. Data objects may be stored in the same or different computer systems 101. Only ten data objects, i.e., d1-d10, are shown for clarity. In practice, an enterprise network maintains a vast amount of data, making it challenging to identify sensitive data and build its lineage for anomaly detection.

FIG. 2 also schematically illustrates a sensitive data object S1 that is representative of sensitive data belonging to the organization, such as credit card information, banking account detail, or secret key information. As will be more apparent below, the sensitive data object S1 may be used as a reference to identify sensitive data objects among the collection 140. Only one reference sensitive data object, i.e., sensitive data object S1, is employed in the example anomaly detection for clarity of illustration. As can be appreciated, additional reference sensitive data objects may be used to reveal particular sensitive data objects among a collection of data objects.

The data objects d1 and d10 have similar, but not identical, contents. Data objects d3, d8, d9, and d10 have the same content (e.g., same secret key information). However, these relationships between data objects are not known and very difficult to establish because the collection 140 typically has vast amounts of data objects. Furthermore, sensitive data objects in the collection 140 may or may not be properly labeled as such and are thus difficult to identify.

The example anomaly detection is explained in the context of 6 users, namely, user-1, user-2, user-3, user-4, user-5, and user-6. In following interaction diagrams, the left side shows the users, the right side shows data objects, and an arrow between a user and a data object represents an operation performed by the user on the data object that has been detected by an endpoint sensor 104 as an event and recorded in the event log 103. The user operations are shown in time order from top to bottom. It should be noted that time orders may be determined from recorded timestamps. That is, when a data object was operated on relative to another data object, and by which user, may be readily determined from timestamps of the corresponding operations. An interaction diagram may be processed as a data structure in memory, displayed as a graph on a display screen, or processed some other way.

Figure 3:
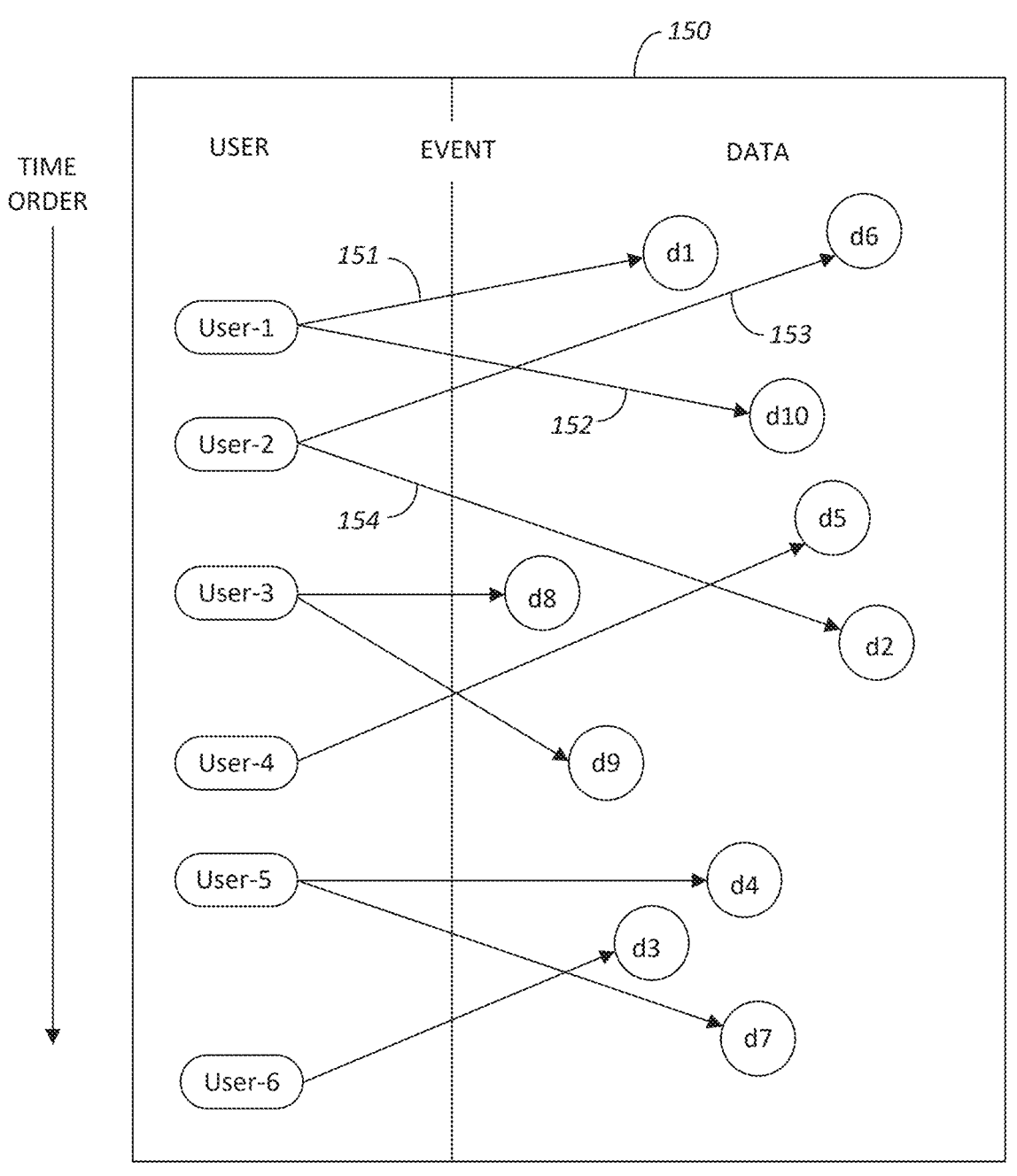
FIG. 3 shows an interaction diagram that schematically illustrates operations involving users and data objects, in accordance with an embodiment of the present invention.

FIG. 3 shows an interaction diagram 150 that schematically illustrates operations involving a user and a data object. In the interaction diagram 150:

User-1 operates on data object d1 (see arrow 151);
User-1 operates on data object d10 (see arrow 152);
User-2 operates on data object d6 (see arrow 153);
User-2 operates on data object d2 (see arrow 154);
User-3 operates on data object d8;
User-3 operates on data object d9;
User-4 operates on data object d5;
User-5 operates on data object d4;
User-5 operates on data object d7; and
User-6 operates on data object d3.

Using a locality-sensitive hash algorithm, the sensitive data object S1 may be used as a reference to identify other sensitive data objects within the collection 140. Unlike other types of hashes, such as cryptographic hashes, small changes to a data object will result in different but very similar locality-sensitive hash values. That is, with a suitable locality-sensitive hash algorithm, such as the TLSH algorithm, a data object and small changes to the data object will likely yield different but very similar locality-sensitive hash values. The mathematical distance ("distance") between locality-sensitive hash values of two data objects may be calculated to determine similarity of the two data objects. The smaller the distance, the more similar the locality-sensitive hash values and thus the data objects. Two data objects may be considered to be similar when their locality-sensitive hash values are within a threshold distance.

In one embodiment, similarity between data objects is determined using the TLSH algorithm. Open source program code of the TLSH algorithm for calculating the TLSH value of a data object is generally available on the Internet and other sources. Open source program code of the TLSH algorithm may also include a distance calculation function, which may be used to calculate similarity of two data objects based on their locality-sensitive hash values.

In a first anomaly detection step, the TLSH value of the sensitive data object S1 and each of data objects d1-d10 is calculated.

In a second anomaly detection step, sensitive data objects from within the collection 140 are identified based on their corresponding TLSH values. In one embodiment, the second anomaly detection step is performed by calculating the distance between the sensitive data object S1 from each data object in the collection 140. The distance may be in terms of a distance score that is calculated as the absolute difference between TLSH values of two data objects that are being compared for similarity. In one embodiment, a distance of 0 indicates that the two data objects are identical (i.e., no difference); a distance between 0 and 100 indicates that the two data objects have similar content; and a distance equal to or greater than 100 indicates that the two data objects have different content. The range for similarity may be adjusted to meet the needs of particular cybersecurity operations. In one embodiment, a data object that is identical or similar to the sensitive data object S1 is considered a sensitive data object.

FIG. 4 shows a distance matrix 200 that shows the distance of the sensitive data object S1 from each of the data objects d1-d10 of the collection 140, in accordance with an embodiment of the present invention. In the distance matrix 200, distance scores that are greater than 100 are shown as an asterisk (*). Referring to the distance matrix 200, the distance between the sensitive data object S1 and data object d1 is zero, indicating that the sensitive data object S1 and data object d1 are identical. The distance between the sensitive data object S1 and each of the data objects d3, d8, d9, and d10 is 50, indicating that the sensitive data object S1 is similar (but not identical) to the data objects d3, d8, d9, and d10. In other words, each of the data objects d3, d8, d9, and d10 partially contains sensitive data. Data objects d2, d4, d5, d6, and d7 are not considered sensitive because they result in a distance score greater than 100 relative to the sensitive data object S1.

From the distance matrix 200, the data objects d1, d3, d8, d9, and d10 are identified as sensitive because they are identical or similar to the sensitive data object S1. That is, the data objects d1, d3, d8, d9, and d10 are also sensitive. Because anomalies often involve sensitive data, focusing on the now identified sensitive data objects d1, d3, d8, d9, and d10 and the users that operated on them facilitates anomaly detection.

Figure 5:
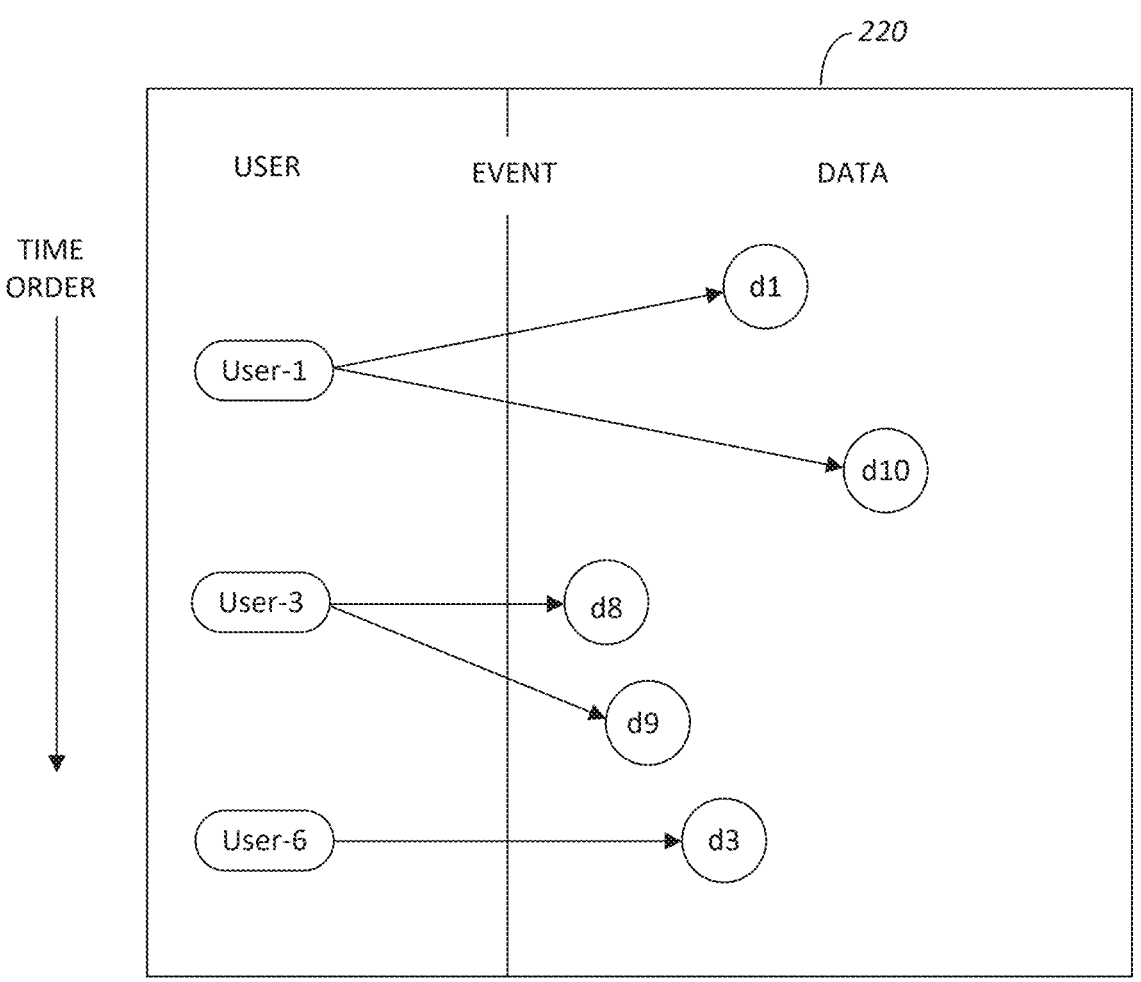
FIG. 5 shows an interaction diagram, in accordance with an embodiment of the present invention.

FIG. 5 shows an interaction diagram 220, in accordance with an embodiment of the present invention. The interaction diagram 220 is the same as the interaction diagram 150 of FIG. 3 except that the interaction diagram 220 only shows the identified sensitive data objects d1, d3, d8, d9, and d10 and users that operated on them.

In a third anomaly detection step, the distance scores between identified sensitive data objects are calculated. FIG. 6 shows a distance matrix 240 that shows the distances between the sensitive data objects d1, d3, d8, d9, and d10. Referring to the distance matrix 240, the distance between data object d1 and each of data objects d3, d8, d9, and d10 is 50; the distance between data object d3 and data object d1 is 50; the distance between data object d3 and each of data objects d8, d9, and d10 is zero; etc. From the distance matrix 240, data objects d3, d8, d9, and d10 have the same content because they have a distance score of zero to each other. Also from the distance matrix 240, the content of data object d1 is similar to that of each of the data objects d3, d8, d9, and d10, because the data object d1 has a distance of 50 to each of the data objects d3, d8, d9, and d10.

In a fourth anomaly detection step, the lineage of the identified sensitive data objects is established by linking similar or identical sensitive data objects on a timeline based on similarity and creation time order. From the distance matrix 240, data objects d1, d3, d8, d9, and d10 can be linked together on a timeline to establish their lineage because they are similar or identical to each other.

Figure 7:
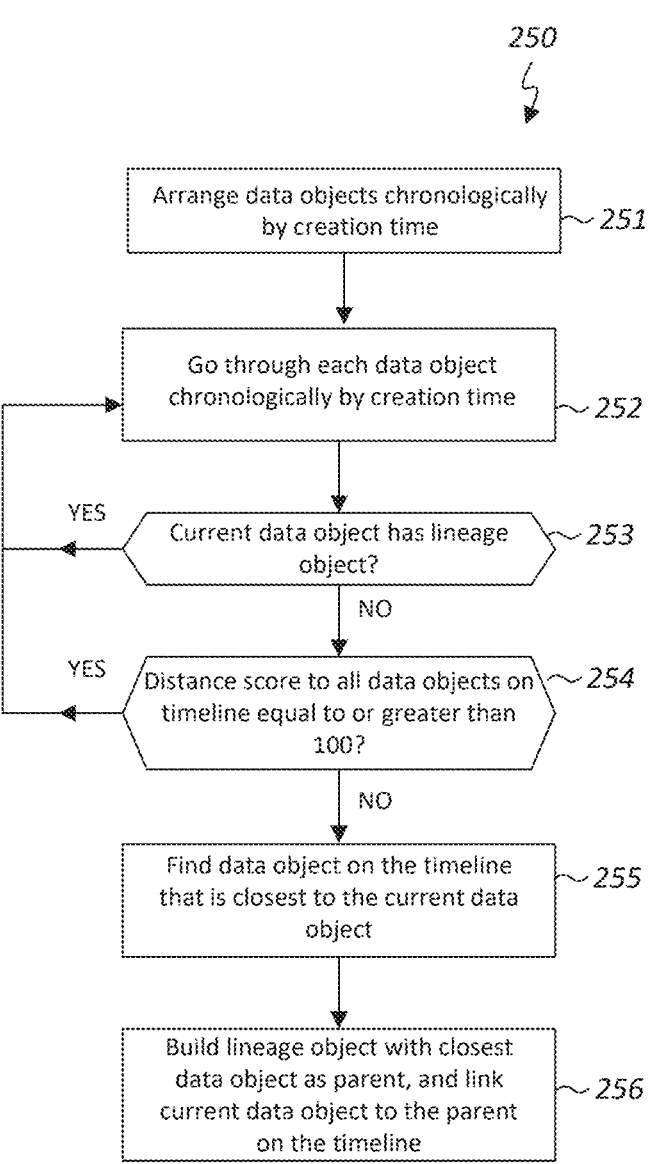
FIG. 7 shows a method of establishing lineage of sensitive data objects, in accordance with an embodiment of the present invention.

FIG. 7 shows a method 250 of establishing lineage of sensitive data objects, in accordance with an embodiment of the present invention.

In step 251, the data objects are arranged in chronological order by creation time.

In step 252, each of the data objects is processed chronologically by creation time order to build a lineage object for that data object. In one embodiment, a lineage object of a data object includes a file path (i.e., where the data object is stored), a TLSH value of the data object, and a parent lineage object. The parent lineage object is the parent of the data object on the timeline.

The data object currently being processed is also referred to herein as "current data object." In step 253, the current data object is skipped (i.e., not processed) when the current data object already has a lineage object.

In step 254, the current data object is skipped when the distance score between the current data object to all other data objects on the timeline of data objects is equal to or greater than 100. Note that the timeline is empty when the current data object is the first data object to be processed. The current data object is automatically added to the timeline when it is the first data object to be processed In step 255, when the current data object does not have a lineage object and has a distance score less than 100 to at least one data object on the timeline, an object on the timeline that is closest to the current data object in terms of distance and creation time is found. In one embodiment, distance is given priority over creation time. That is, a data object that has a lowest distance score to the current data object is considered closest to the current data object. However, creation time is used as a tie breaker when there are multiple closest data objects that have the same distance to the current data object. In other words, when several data objects that have the same distance score to the current data object are closest to the current data object in terms of distance, the one that is closest to the current data object in terms of creation time is considered the closest to the current data object.

In step 256, a lineage object is built for the current data object, with the lineage object indicating the other object on the timeline that is found to be closest to the current data object in terms of distance and creation time as the parent lineage object. The current data object is added to the timeline and linked to the parent lineage object on the timeline.

Figure 8:
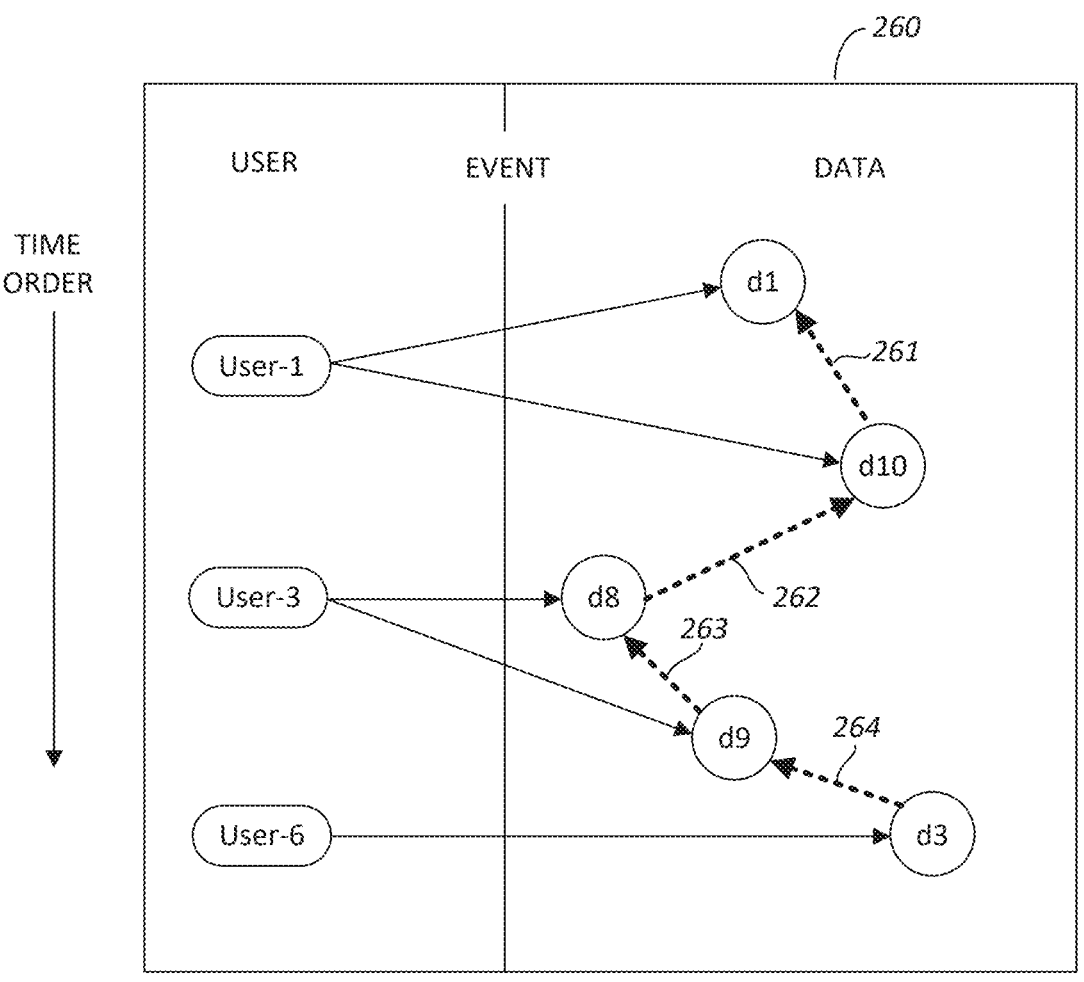
FIG. 8 shows an interaction diagram, in accordance with an embodiment of the present invention.

FIG. 8 shows an interaction diagram 260, in accordance with an embodiment of the present invention. The interaction diagram 260 is the same as the interaction diagram 250 of FIG. 5, except that data objects d1, d3, d8, d9, and d10 are arranged and linked on a timeline to establish their lineage according to the method 250 of FIG. 7. In the example anomaly detection, data object d1 was created first, then followed by, in time order, data objects d10, d8, d9, and d3. In other words, by creation time order, the sensitive data items identified in the second anomaly detection step are arranged and processed through the method 250 as follows: d1, d10, d8, d9, and d3. Data object d1 does not have a lineage object and is a first object on the timeline. A lineage object that has no parent lineage object is created for data object d1.

Next, processing data object d10 through the method 250, data object d10 has no lineage object and has a distance of 50 to data object d1 (the only data object on the timeline at this point). Accordingly, a lineage object is built for data object d10, with data object d1 as the parent lineage object (see arrow 261). The timeline now has data objects d1 and d10.

Next, processing data object d8 through the method 250, data object d8 has no lineage object, has a distance of 50 to data object d1, and has a distance of zero to data object d10. Data object d10 is thus closest to data object d8 in terms of distance. A lineage object is built for data object d8, with data object d10 as the parent lineage object (see arrow 262). The timeline now has data objects d1, d10, and d8.

Next, processing data object d9 through the method 250, data object d9 has no lineage object, has a distance of 50 to data object d1, has a distance of zero to data object d10, and has a distance of zero to data object d8. Data objects d10 and d8 are both closest to data object d9 in terms of distance, but data object d8 is closest to data object d9 in terms of creation time. Accordingly, a lineage object is built for data object d9, with data object d8 as the parent lineage object (see arrow 263). The timeline now has data objects d1, d10, d8, and d9.

Next, processing data object d3 through the method 250, data object d3 has no lineage object, has a distance of 50 to data object d1, has a distance of zero to data object d10, has a distance of zero to data object d8, and has a distance of zero to data object d9. Data objects d10, d8, and d9 are closest to data object d3 in terms of distance, but data object d9 is closest to data object d3 in terms of creation time. Accordingly, a lineage object is built for data object d3, with data object d9 as the parent lineage object (see arrow 264). The timeline now has data objects d1, d10, d8, d9, and d3.

The interaction diagram 260 shows the lineage of the data objects d1, d10, d8, d9, and d3 in terms of origin and creation time order. The history of the data objects in terms of operations, users, timestamps, etc. may be obtained from corresponding records of the event log 103. An interaction diagram, and thus the timeline, may be amended as operations are performed on data objects on the timeline.

In the case where user-1 subsequently modifies data object d1 resulting in a data object d1A that is similar to data object d1, the interaction diagram 260 may be amended as explained with reference to FIGS. 9 and 10.

FIG. 9 shows a distance matrix 270 that shows the distances between data objects d1, d3, d8, d9, d10, and d1A. The distance matrix 270 is the distance matrix 240 of FIG. 6, with the addition of data object d1A. Referring to the distance matrix 270, the distance between data object d1A and data object d1 has been calculated to be 20. The distance of the data object d1A to each of data objects d3, d8, d9, and d10 has been calculated to be 70.

Figure 10:
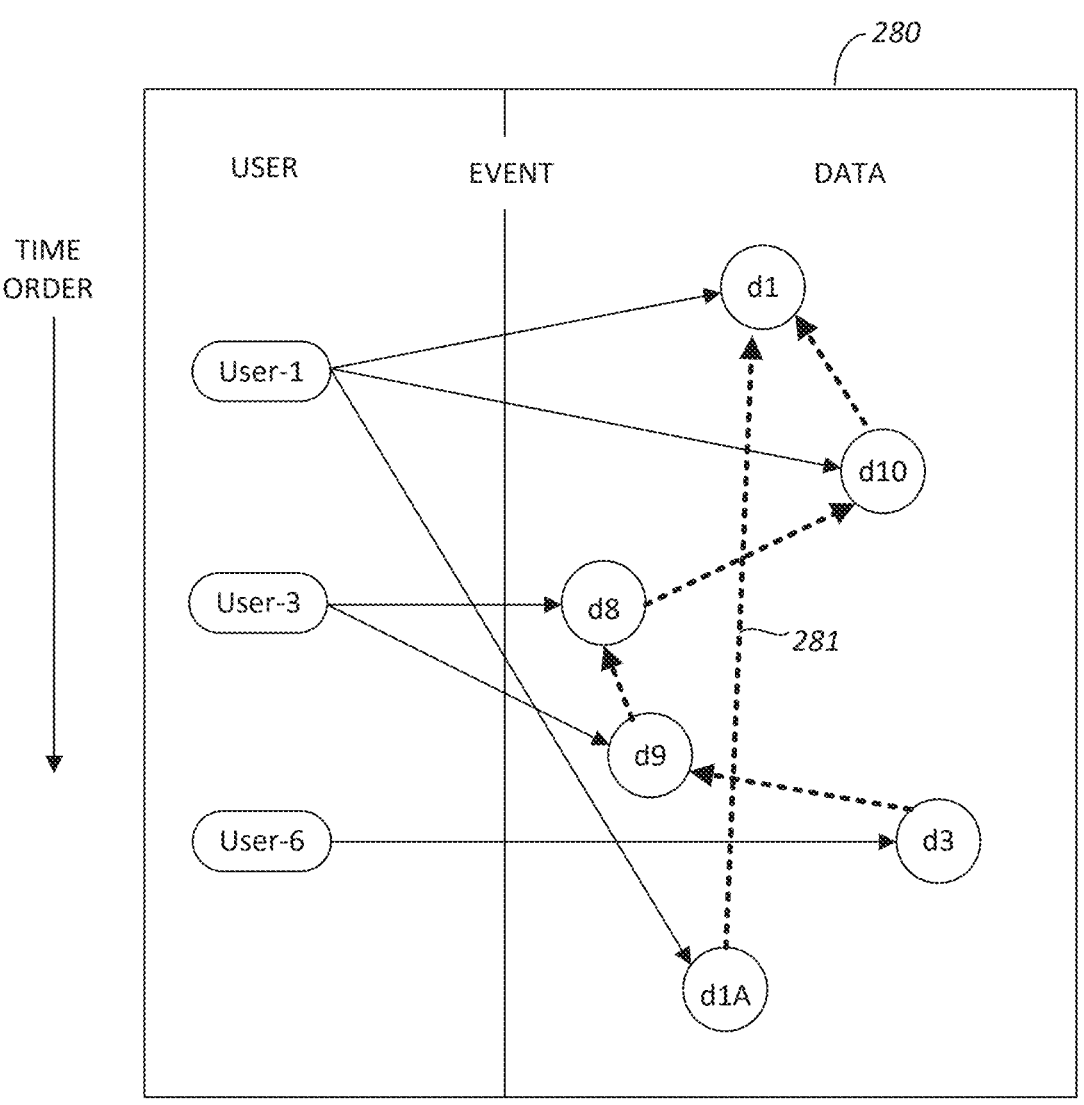
FIG. 10 shows an interaction diagram, in accordance with an embodiment of the present invention.

FIG. 10 shows an interaction diagram 280, in accordance with an embodiment of the present invention. The interaction diagram 280 is the same as the interaction diagram 260 of FIG. 8, except that data object d1A has been added to the timeline to establish its lineage according to the method 250 of FIG. 7. Data object d1A has no lineage object and is closest to data object d1 on the timeline in terms of distance score. A lineage object is thus built for data object d1A, with data object d1 as the parent lineage object (see arrow 281).

In the case where user-1 uses the content of data object d10 to modify data object d1 resulting in data object d1B that is similar to data object d1 but has the same content as data objects d3, d8, d9, and d10, the interaction diagram 260 may be amended as explained with reference to FIGS. 11 and 12.

FIG. 11 shows a distance matrix 290 that shows the distances between data objects d1, d3, d8, d9, d10, and d1B. The distance matrix 290 is the distance matrix 240 of FIG. 6, with the addition of data object d1B. Referring to the distance matrix 290, the distance between data object d1B and data object d1 has been calculated to be 50. The distance between data object d1B to each of data objects d3, d8, d9, and d10 has been calculated to be zero.

Figure 12:
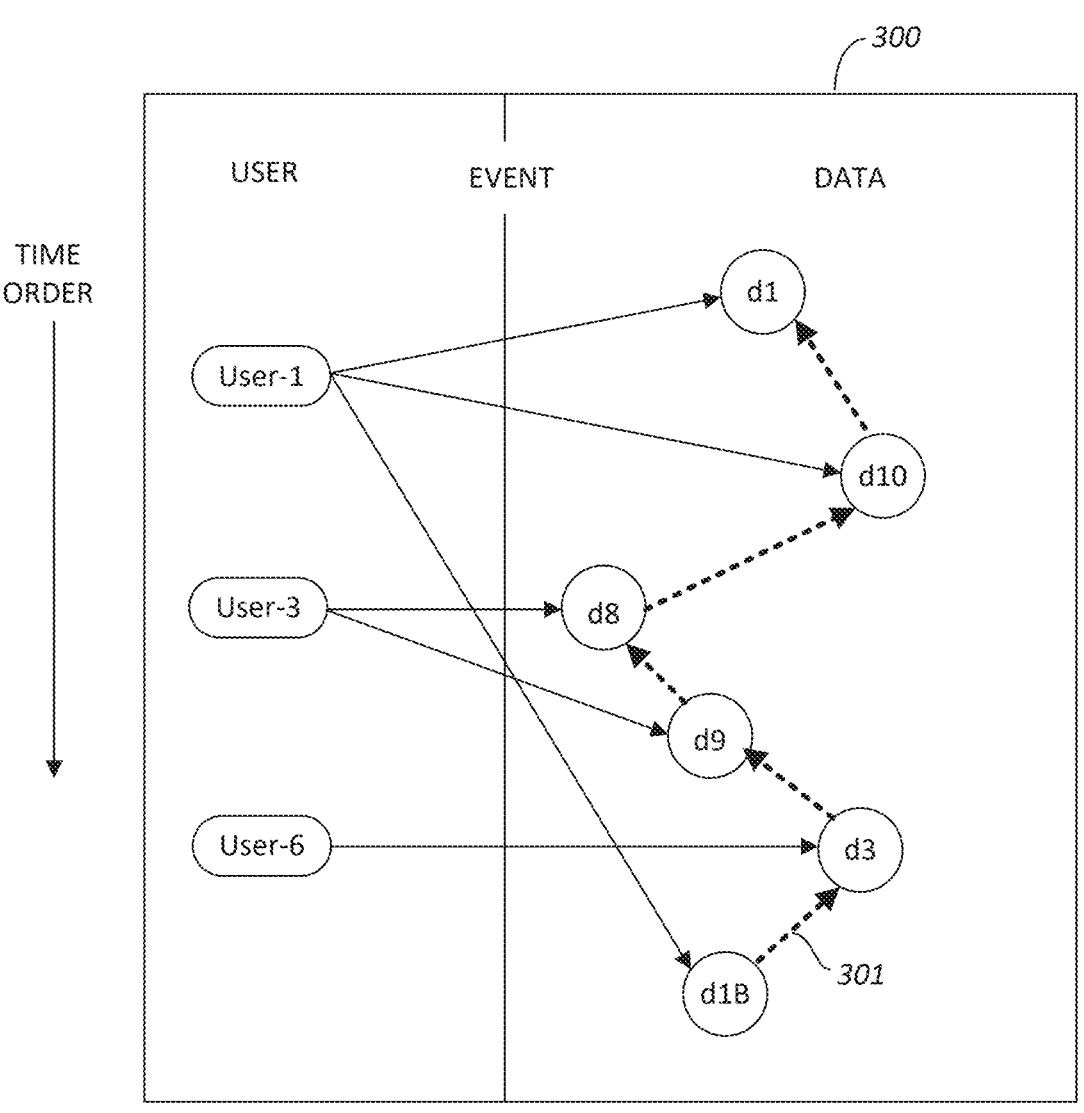
FIG. 12 shows an interaction diagram, in accordance with an embodiment of the present invention.

FIG. 12 shows an interaction diagram 300, in accordance with an embodiment of the present invention. The interaction diagram 300 is the same as the interaction diagram 260 of FIG. 8, except that data object d1B has been added to the timeline to establish its lineage according to the method 250 of FIG. 7. Data object d1B has no lineage object and is closest to data objects d3, d8, d9, and d10 in terms of distance. However, data object d1B is closest to data object d3 in terms of creation time. A lineage object is thus built for data object d1B, with data object d3 as the parent lineage object (see arrow 301).

Identifying sensitive data objects from a plurality of data objects and linking the identified data objects on a timeline establishes the lineage of the identified data objects, which facilitates anomaly detection in the enterprise network 100.

In a fifth anomaly detection step, event are filters created. As will be more apparent below, event filters may be applied on a timeline of sensitive data objects to detect anomalies. In one embodiment, the anomaly detector 131 includes the following event filters: data creation; data accessing; data replication; data movement; data wiping; and data modification.

The data creation filter is configured to filter data objects on a timeline to identify users that created new data objects. The filtering rule for the data creation filter may be based on the timestamp of an event, the action of the event (data creation), and the type of data object. In one embodiment, the action of the event indicates whether the event is a creation event, accessing event, replication event, movement event, wiping event, or modification event. The type of the data object indicates whether or not the data object is sensitive.

In the example anomaly detection, assume that user-1 and user-3 are involved in the following events that happened in time order involving data objects d10 and d8 that are stored in different locations:

(a) user-1 contributes one event: create data object d10; and (b) user-3 contributes one event: create data object d8.

Figure 13:
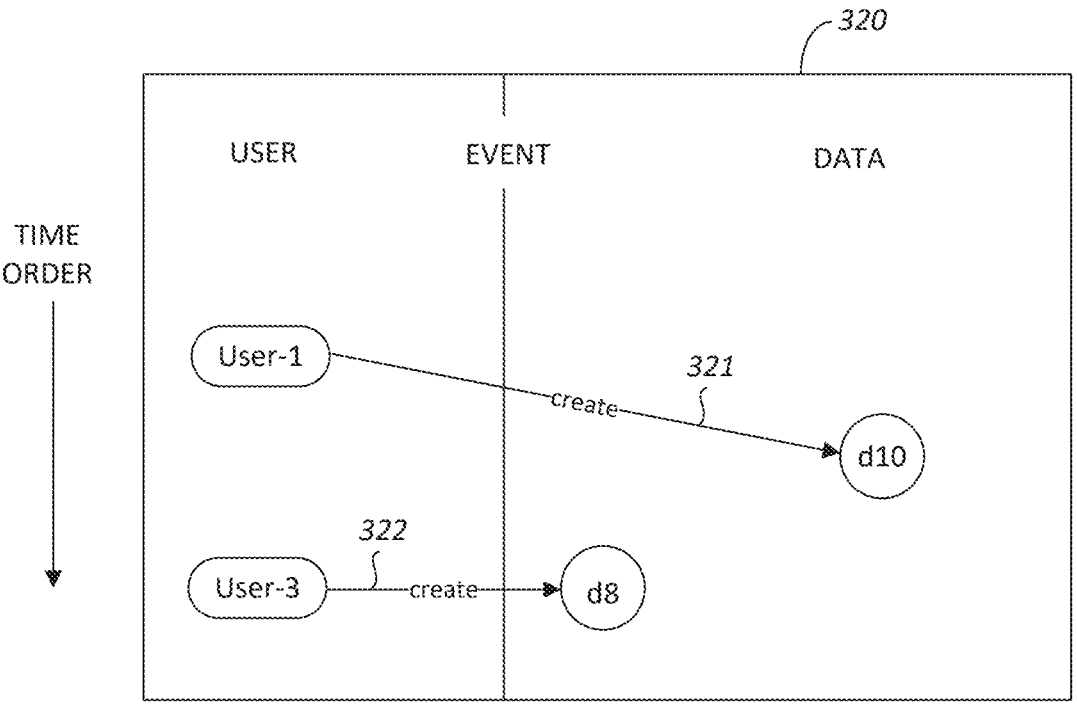
FIGS. 13-18 show interaction diagrams that result from applying event filters to a timeline of data objects, in accordance with embodiments of the present invention.

Applying the data creation filter on the interaction diagram 260 of FIG. 8 results in the interaction diagram 320 shown in FIG. 13. The interaction diagram 320 identifies user-1 as having created data object d10 (see FIG. 13, arrow 321) and user-3 as having created data object d8 (see FIG. 13, arrow 322). Data objects d10 and d8 were created separately by different users.

The data accessing filter is configured to filter data objects on a timeline to identify data objects that have been accessed by users. A data object is considered to have been accessed by a user when the data object has been read by the user and its parent lineage object is in a create state. The filtering rule for the data accessing filter may be based on the timestamp of the event, the action of the event (data accessing), and the type of data object. In the example anomaly detection, assume that user-1 and user-3 are involved in the following events that happened in time order involving identified sensitive data objects d10 and d8 that are stored in the same location:

(a) user-1 contributes one event: create data object d10; and (b) user-3 contributes one event: read data object d8.

Figure 14:
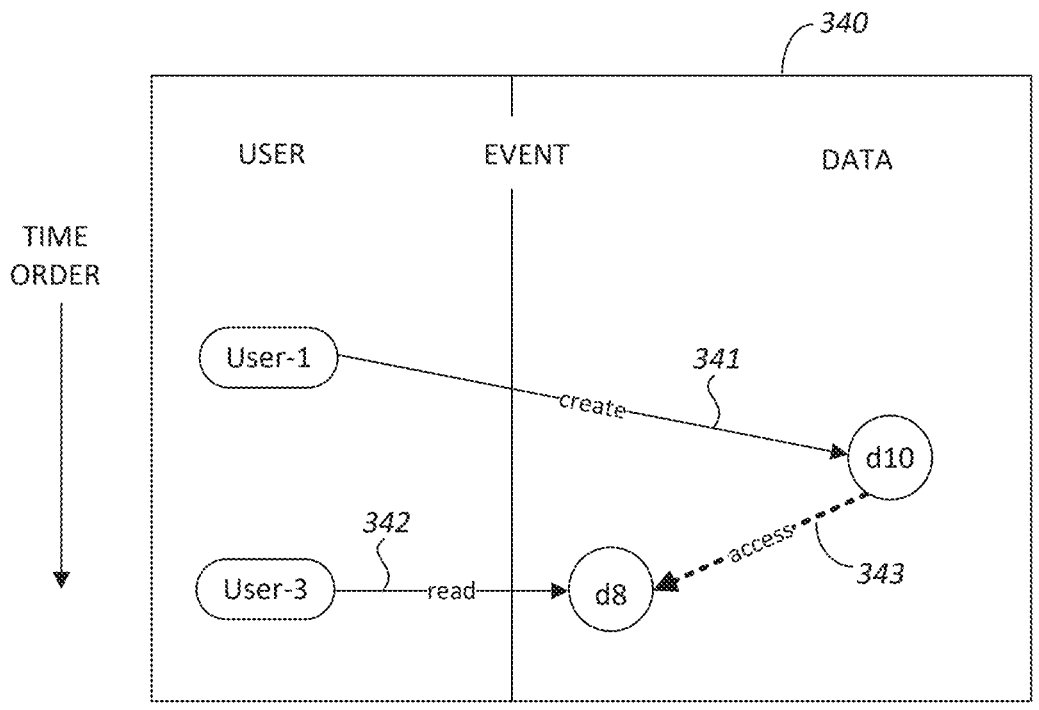

Applying the data accessing filter on the interaction diagram 260 of FIG. 8 results in the interaction diagram 340 shown in FIG. 14. The interaction diagram 340 identifies user-1 as having created data object d10 (see FIG. 14, arrow 341), and user-3 as having read data object d8 (see arrow FIG. 14, 342). From the lineage of data object d8 (see FIG.

8, arrow 262), user-3 is identified as having accessed data object d10 (see FIG. 14, arrow 343).

The data replication filter is configured to filter data objects on a timeline to identify data objects that have been replicated. A data object is considered to have been replicated when the data object and its parent lineage object are not in the same location, and its parent lineage object is not in a delete state. The filtering rule for the data replication filter may be based on the timestamp of the event, the action of the event (data replication), and the distance scores between data objects involved in the event.

In the example anomaly detection, assume that user-1, user-3, and user-6 are involved in the following events that happened in time order involving data objects d10, d8, d9, and d3 that are stored in different locations:

(a) user-1 contributes one event: create data object d10;

(b) user-3 contributes two events: create data objects d8 and d9; and (c) user-6 contributes one event create data object d3.

Figure 15:
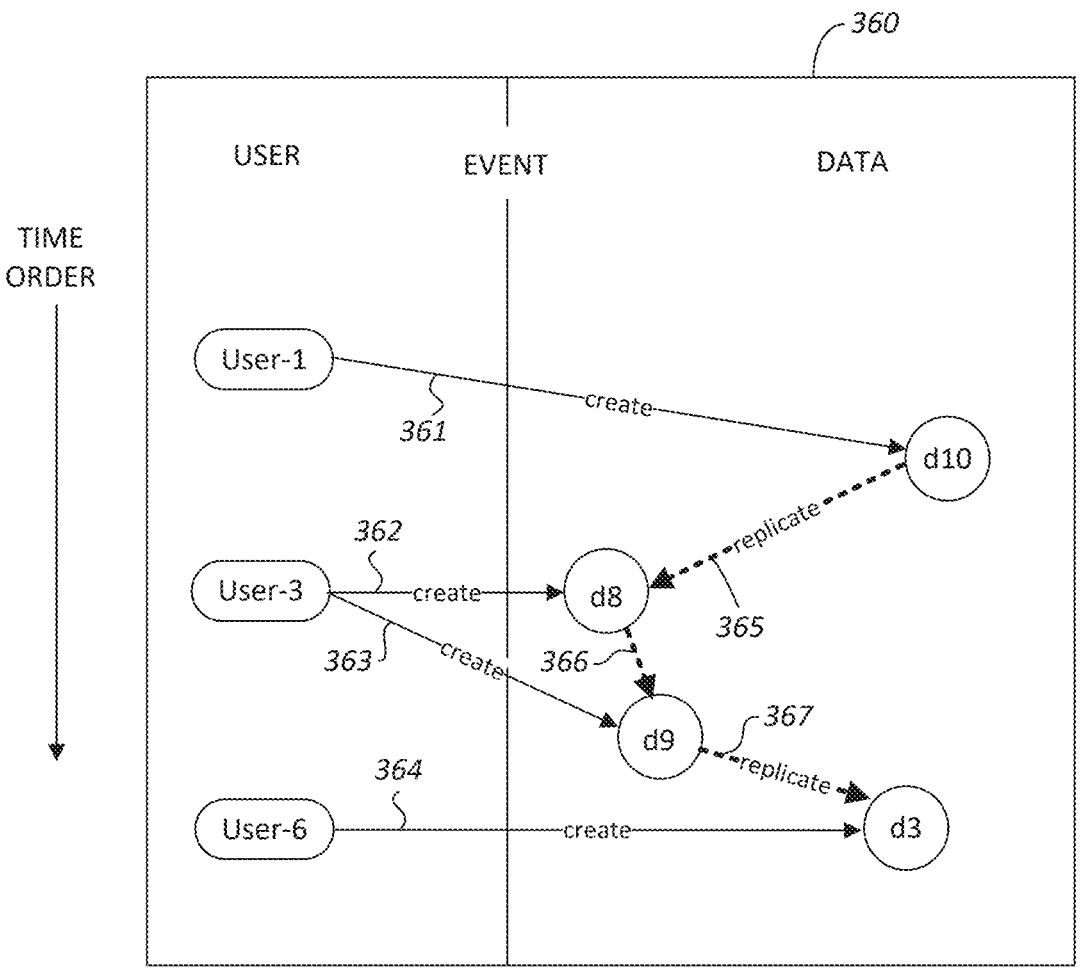
Figure 16:
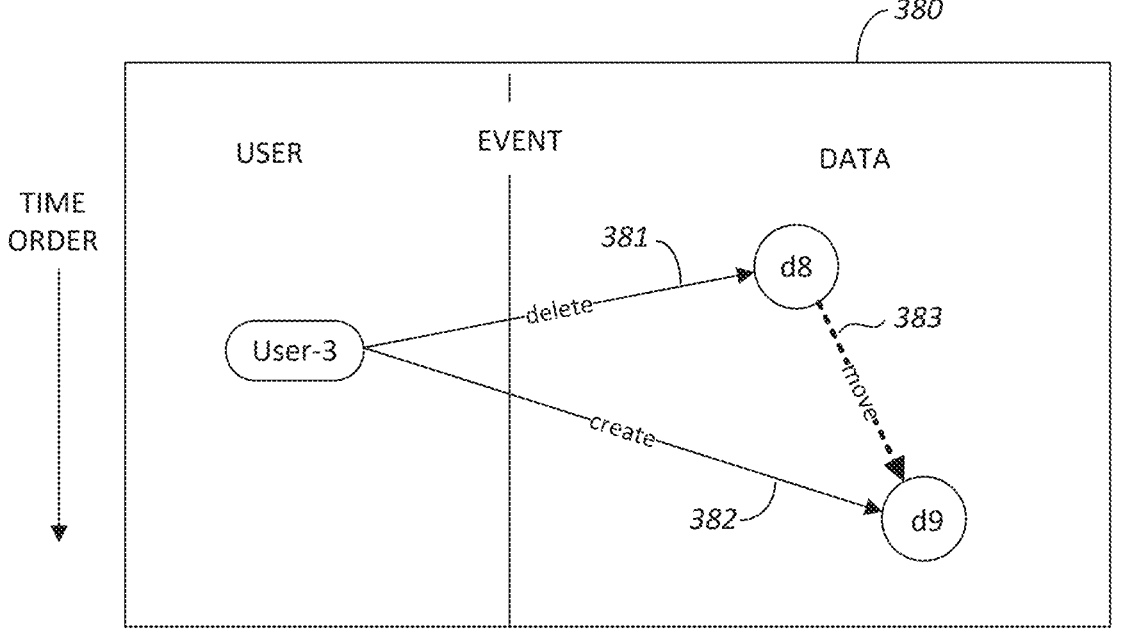
Figure 17:
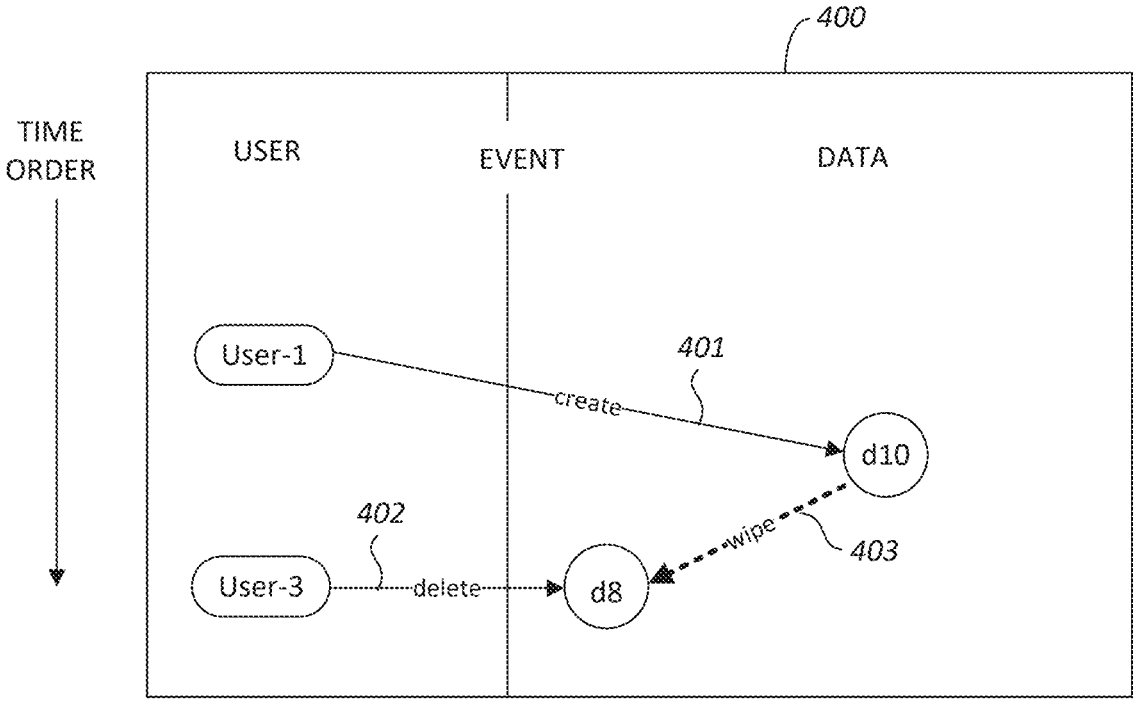
Figure 18:
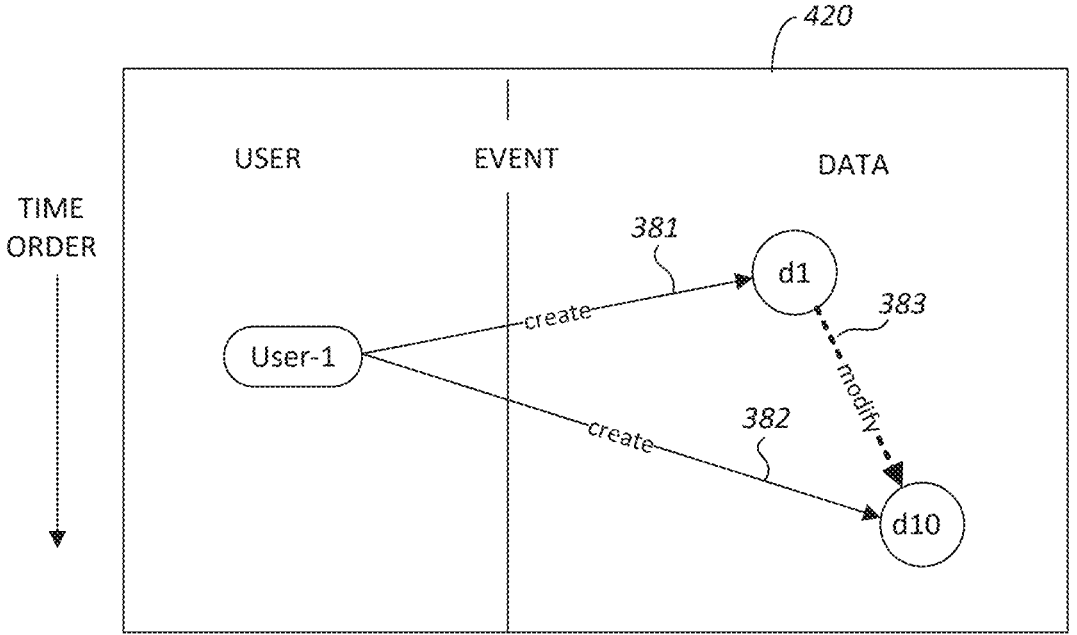
Figure 19:
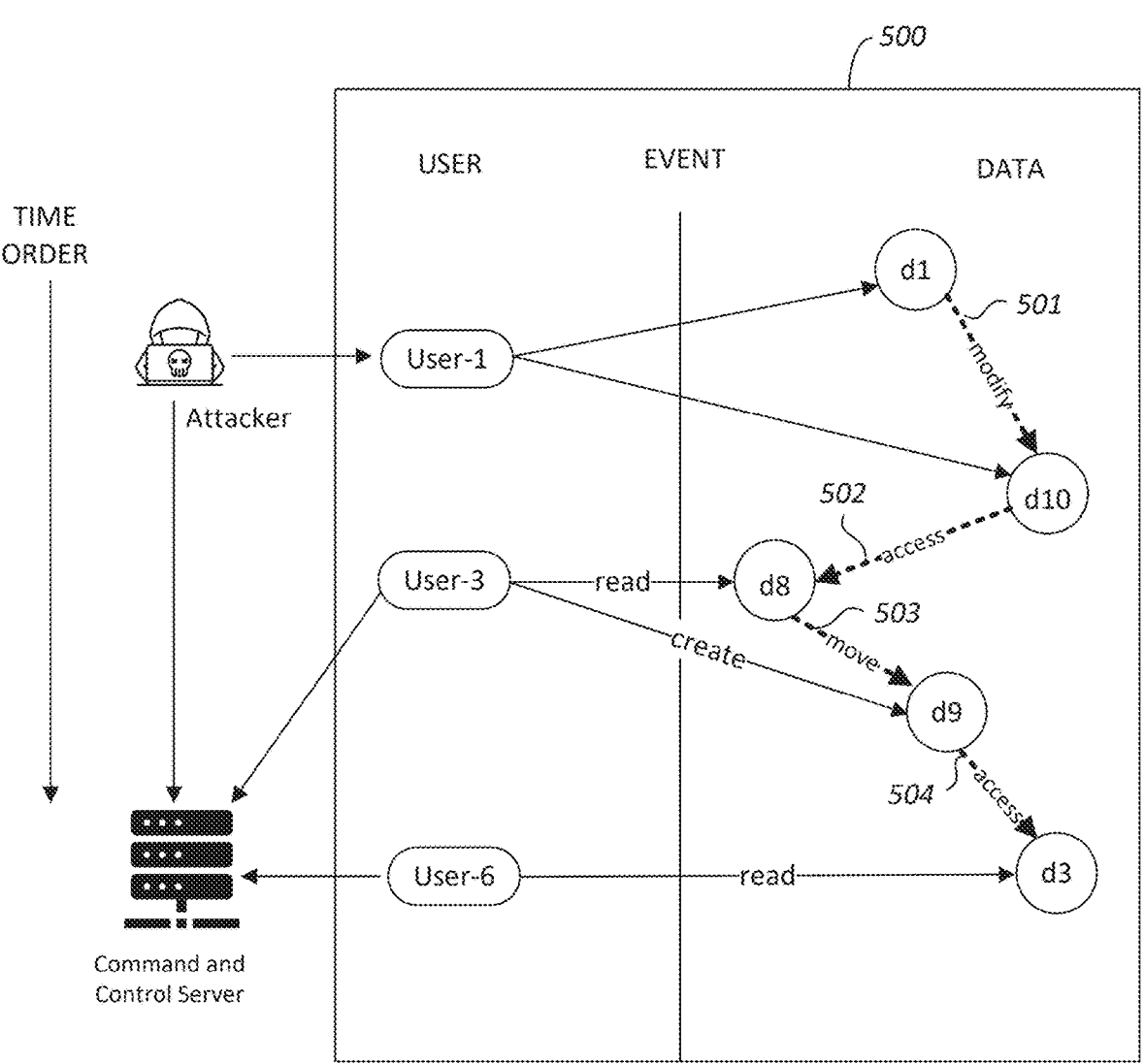
FIGS. 19 and 20 show interaction diagrams that result from applying event filters to a timeline of data objects to detect anomalies, in accordance with embodiments of the present invention.
Figure 20:
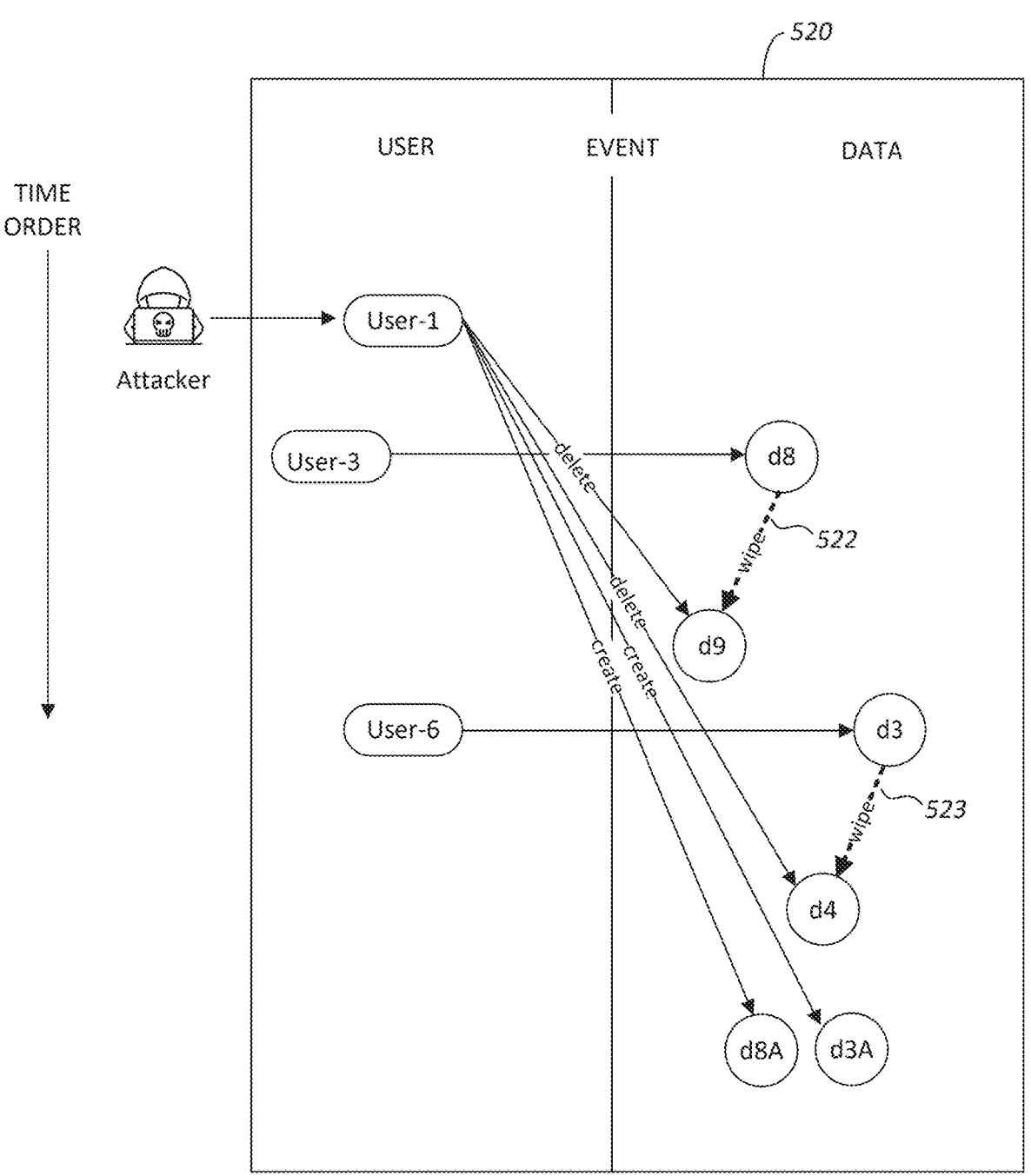

Applying the data replication filter on the interaction diagram 260 of FIG. 8 results in the interaction diagram 360 shown in FIG. 15. The interaction diagram 360 identifies user-1 as having created data object d10 (see FIG. 15, arrow 361), user-3 as having created data object d8 (see FIG. 15, arrow 362) and data object d9 (see FIG. 15, 363), and user-6 as having created data object d3 (see FIG. 15, 364). From the lineage of data objects d3, d8, d9, and d10 (see FIG. 8, arrows 262-264) and their distance scores, data object d10 is identified as having been replicated as data object d8 (see FIG. 15, arrow 365), data object d8 is identified as having been replicated as data object d9 (see FIG. 15, arrow 366), and data object d9 is identified as having been replicated as data object d3 (see FIG. 15, arrow 367).

The data movement filter is configured to filter data objects on a timeline to identify data objects that have been moved to a different location. A data object is deemed to have been moved when the data object and its parent lineage object have different file paths, and its parent lineage object is in a delete state. The filtering rule for the data movement filter may be based on the timestamp of the event, the action of the event (data movement), and the distance scores between data objects involved in the event.

In the example anomaly detection, assume that user-3 deleted data object d8 and then created data object d9. Applying the data movement filter on the interaction diagram 260 of FIG. 8 results in the interaction diagram 380 shown in FIG. 16. The interaction diagram 360 identifies user-3 as having deleted data object d1 (see FIG. 16, arrow 381) then created data object d9 (see FIG. 16, arrow 382). From the lineage of data objects d8 and d9 and the distance between them being zero, data object d8 is identified as having been moved as data object d9 (see FIG. 16, arrow 383).

The data wiping filter is configured to filter data objects on a timeline to identify data objects that have been deleted. The filtering rule for the data wiping filter may be based on the timestamp of the event, the action of the event (data wiping), and the distance scores between data objects involved in the event.

In the example anomaly detection, assume that user-1 and user-3 are involved in the following events that happened in time order involving data objects d10 and d8 that are stored in the same location:

(a) user-1 contributes one event: create data object d10; and (b) user-3 contributes one event: delete data object d8.

The location of data objects d10 and d8 may be found from their file paths in their corresponding lineage objects. Applying the data replication filter on the interaction diagram 260 of FIG. 8 results in the interaction diagram 400 shown in FIG. 17. The interaction diagram 400 identifies user-1 as having created data object d10 (see FIG. 17, arrow 401) and user-3 as having deleted data object d8 (see FIG. 17, arrow 402). The distance score between data objects d8 and d10 is zero, meaning they are identical. From the lineage of data objects d8 and d10 (see FIG. 8, arrow 262) and their distance scores, data object d10 was in the same location as data object d8, data objects d10 and d8 have the same content, and data object d8 was created after data object d10. Data object d10 is thus identified as having been wiped by user-3 (see FIG. 17, arrow 403) when user-3 deleted data object d8.

The data modification filter is configured to filter data objects on a timeline to identify data objects that have been modified. A data object is considered to have been modified when the data object and its parent lineage object are in the same location and have similar or identical contents. The filtering rule for the data modification filter may be based on the timestamp of the event, the action of the event (data modification), and the distance scores between data objects involved in the event.

In the example anomaly detection, assume that user-1 created data object d1 then created data object d10. Applying the data modification filter on the interaction diagram 260 of FIG. 8 results in the interaction diagram 420 shown in FIG. 18. The interaction diagram 420 identifies user-1 as having created data object d1 (see FIG. 18, 381) and then created data object d10 (see FIG. 18, arrow 382). The distance score between data objects d1 and d10 is 50, meaning they are similar. From the lineage of data objects d1 and d10 (see FIG. 8, arrow 261), their file paths, and their distance scores, data object d10 is identified as a modified version of data object d1 (see FIG. 18, arrow 383).

In a fifth anomaly detection step, one or more event filters are applied on a timeline of data objects to detect anomalies in the enterprise network 100.

In the example anomaly detection, assume user-1 created data object d1 to store, in the same location, server information of an internal file server that includes a server uniform resource locator (URL), server ID, and password. User-3 and user-6 followed the enterprise policy to read data object d1 to know how to connect to the internal file server. The following events happened in time order:

(a) an attacker compromised the account of user-1 to modify the content of data object d1 to data object d10;

(b) User-3 read data object d8 and accessed the command and control server of the attacker according to the content of data object d8;

(c) User-3 created data object d9; and (d) User-6 read data object d3 and accessed the command and control server of the attacker according to the content of data object d3.

The data modification filter, the data accessing filter, and data movement filter may be applied to the timeline to detect an anomaly that is indicative of intrusion. More particularly, applying the data modification filter, the data accessing filter, and data movement filter on the interaction diagram 260 of FIG. 8 results in the interaction diagram 500 shown in FIG. 19. The interaction diagram 500 identifies user-1 as having modified data object d1 to data object d10 (see FIG. 19, arrow 501), user-3 has accessed data object d10 by reading data object d8 (see FIG. 19, arrow 502), user-3 has moved data object d8 to data object d9 (see FIG. 19, arrow 503), and user-6 has accessed data object d9 by reading data object d3 (see FIG. 19, arrow 504). The distance matrix of the data objects d10, d8, d9, and d3 indicates that they are identical. The timeline indicates that data object d8 inherits from data object d10, data object d9 inherits from data object d8, and data object d3 inherits from data object d9. These operations involving the data objects d1, d10, d8, d9, and d3 are highly suspicious and match the typical behavior of an attacker in an intrusion. Advantageously, from the filtered timeline, the data objects involved in the anomaly and the users that operated on the data objects may be flagged for investigation and/or mitigation.

In the example anomaly detection, assume the following events happened in time order:

(a) An attacker compromised the account of user-1;

(b) User-1 deleted data object d9;

(c) User-1 created data object d8A that has the encoded content of data object d8;

(d) User-1 deleted data object d4; and (c) User-1 created the data object d3A that has the encoded content of data object d3.

From their distance matrix, data objects d9 and d8 are identical, and data objects d3 and d4 are identical. First, the interaction diagram 260 of FIG. 8 is modified to include the data objects d8A and d3A. Then, applying the data creation filter and the data wiping filter on the modified interaction diagram 260 of FIG. 8 results in the interaction diagram 520 shown in FIG. 20. The interaction diagram 520 identifies data object d8 as having been wiped (see FIG. 20, arrow 522) when user-1 deleted data object d9, and data object d3 as having been wiped (see FIG. 20, arrow 523) when user-1 deleted data object d4. These operations involving the data objects d8, d9, d3, d4, d8A, and d3A are highly suspicious and match the typical behavior of an attacker in a ransomware attack. Advantageously, from the filtered timeline, the data objects involved in the anomaly and the users that operated on the data objects may be flagged for investigation and/or mitigation.

Generally, different sets of event filters may be employed to detect particular anomalies. The application of a set of event filters to a timeline of data objects may be augmented with correlations with other cybersecurity components and/ or detection rules to enhance detection sensitivity and accuracy.

FIG. 21 shows a flow chart of a method 600 of detecting anomalies in a computer network, in accordance with an embodiment of the present invention. The method 600 may be performed by the anomaly detector 131 that is running on the anomaly detection system 130 (shown in FIG. 1). As can be appreciated, other components may also be employed without detracting from the merits of the present invention.

In step 601, a plurality of files of an organization is enumerated. In one embodiment, the files are stored across computer systems that are connected to a computer network of the organization. Events involving the files are recorded in a file event log. A record in the event log may indicate the location of a file, the user that operated on the file, the action/operation on the file, timestamps, and other information relating to the file.

In step 602, the locality-sensitive hash value of each of the plurality of files is calculated. In one embodiment, locality-sensitive hash values are calculated using the TLSH algorithm.

In step 603, sensitive files are identified from among the plurality of files. In one embodiment, sensitive files are identified by determining the distance between a reference sensitive file and each of the plurality of files. The reference sensitive file is a known sensitive file. The locality-sensitive hash value of the reference sensitive file may be compared to the locality-sensitive hash value of a target file of the plurality of files to determine the distance between them in terms of distance score. The distance score may be compared to ranges of distance scores to determine whether or not the target file is similar or identical to the reference sensitive file. In one embodiment, a distance score of zero indicates that the target file and the reference sensitive file are identical, a distance score between zero and 100 indicates that the target file and the reference sensitive file are similar, and a distance score equal to or greater than 100 indicates that the target file and the reference sensitive file are not similar. A file of the plurality of files is considered to be sensitive when the file is identical or similar to the reference sensitive file.

In step 604, similarity between identified sensitive files is determined based on their distance from each other. In one embodiment, distance scores between identified sensitive files are noted in a distance matrix.

In step 605, identified sensitive files are linked on a timeline based on their similarity to each other and creation time.

In step 606, one or more event filters are applied to the timeline to detect anomalies involving files on the timeline and users that operated on the files.

In step 607, files involved in the anomalies and users that operated on the files are flagged.

In step 608, mitigation is performed on the flagged files and users. The mitigation may include raising an alert to report the files and users, putting the files in quarantine, blocking user access, etc.

Figure 22:
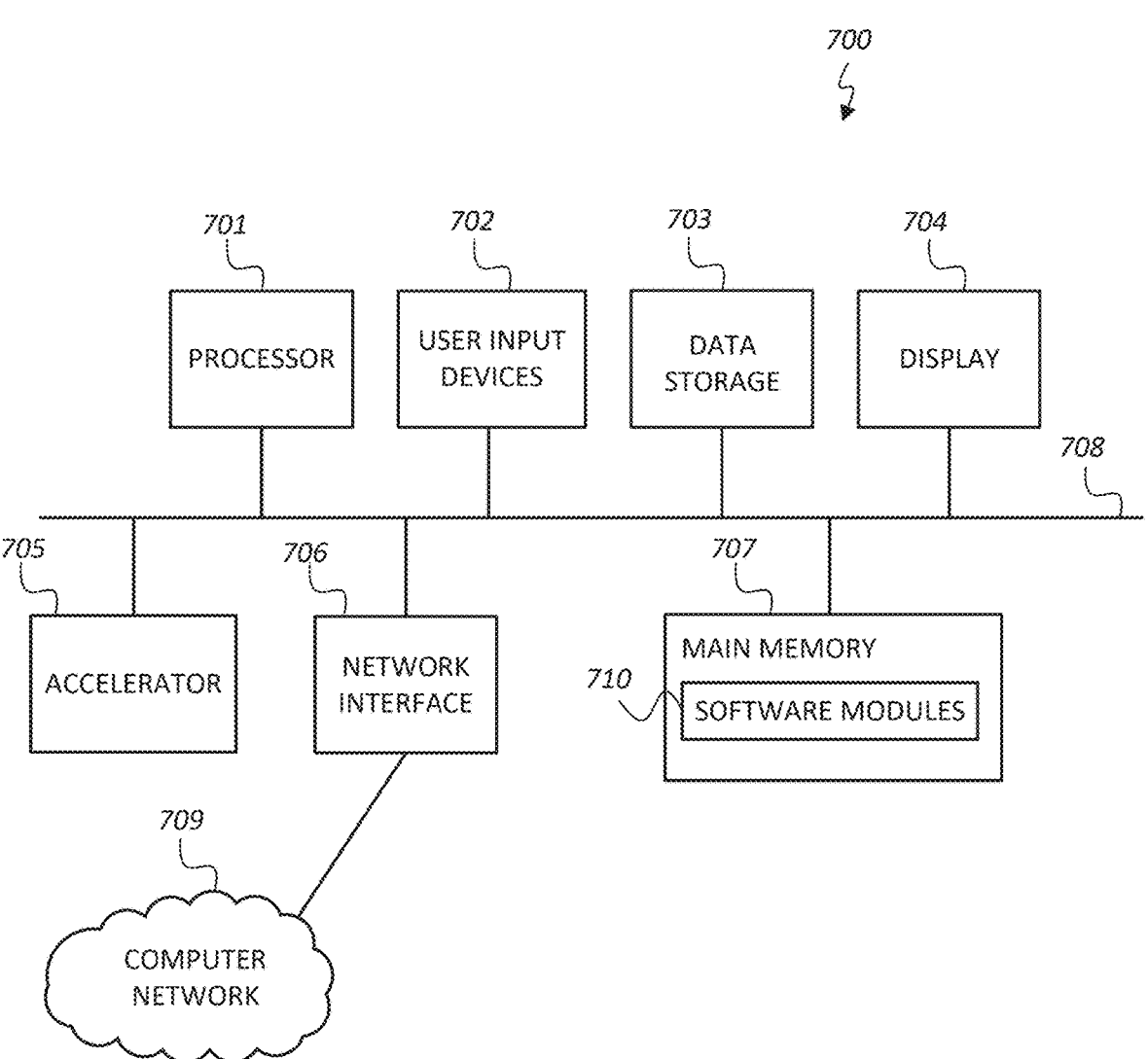
FIG. 22 shows a block diagram of a computer system that may be employed with embodiments of the present invention.

FIG. 22 shows a block diagram of a computer system 700 that may be employed with embodiments of the present invention. The computer system 700 may be employed as an anomaly detection system or other computer described herein. The computer system 700 may have fewer or more components to meet the needs of a particular application. The computer system 700 may include one or more processors 701, one or more user input devices 702 (e.g., keyboard, mouse), one or more data storage devices 703 (e.g., hard drive, optical disk, solid state drive), a display screen 704 (e.g., liquid crystal display, flat panel monitor), one or more accelerators 705 (e.g., graphics processing unit (GPU), neural processing unit (NPU)), a computer network interface 706 (e.g., network adapter, modem), and a main memory 707 (e.g., random access memory). The computer system 700 may have one or more buses 708 coupling its various components. The computer network interface 706 may be coupled to a computer network 709, which in this example includes the public Internet.

The computer system 700 is a particular machine as programmed with one or more software modules 710, comprising instructions stored non-transitory in the main memory 707 for execution by at least one processor 701 to cause the computer system 700 to perform corresponding programmed steps. An article of manufacture may be embodied as computer-readable storage medium including instructions that when executed by at least one processor 701 cause the computer system 700 to be operable to perform the functions of the one or more software modules 710. In one embodiment where the computer system 700 is configured as an anomaly detection system, the software modules 710 comprise instructions of an anomaly detector.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of detecting anomalies in a computer network, the method comprising:

enumerating a plurality of files that are on computer systems of the computer network;

calculating a locality-sensitive hash value of each of the plurality of files;

identifying sensitive files from among the plurality of files based on corresponding locality-sensitive hash values of the plurality of files;

determining similarity of the identified sensitive files to each other by comparing corresponding locality-hash values of the identified sensitive files;

linking the identified sensitive files on a timeline based on the similarity of the identified sensitive files to each other and file creation time of the identified sensitive files;

applying one or more event filters to the timeline to detect an anomaly;

flag sensitive files on the timeline that are involved in the anomaly; and performing mitigation on the flagged sensitive files.

2. The method of claim 1, wherein determining the similarity of the identified sensitive files to each other comprises:

determining distance scores between the identified sensitive files; and comparing the distance scores to similarity thresholds.

3. The method of claim 1, wherein the locality-sensitive hash value of each of the plurality of files is calculated using Trend Locality Sensitive Hashing (TLSH) algorithm.

4. The method of claim 1, further comprising:

performing mitigation on users that operated on the flagged sensitive files.

5. The method of claim 1, wherein the mitigation includes raising an alert.

6. The method of claim 1, wherein the anomaly is indicative of intrusion.

7. A computer system comprising at least one processor and a memory, the memory storing instructions that when executed by the at least one processor cause the computer to:

calculate a locality-sensitive hash value of each of a plurality of files;

identify sensitive files from among the plurality of files based on corresponding locality-sensitive hash values of the plurality of files;

determine similarity of the identified sensitive files to each other by comparing corresponding locality-hash values of the identified sensitive files;

link the identified sensitive files on a timeline based on the similarity of the identified sensitive files to each other and file creation time of the identified sensitive files;

apply one or more event filters to the timeline to detect an anomaly; and perform mitigation on sensitive files on the timeline that are involved in the anomaly.

8. The computer system of claim 7, wherein the similarity of the identified sensitive files to each other is determined by:

determining distance scores between the identified sensitive files; and comparing the distance scores to similarity thresholds.

9. The computer system of claim 7, wherein the locality-sensitive hash value of each of the plurality of files is calculated using Trend Locality Sensitive Hashing (TLSH) algorithm.

10. The computer system of claim 7, wherein the instructions in the memory when executed by the at least one processor cause the computer system to:

perform the mitigation on users that operated on the sensitive files that are involved in the anomaly.

11. The computer system of claim 7, wherein the mitigation includes raising an alert.

12. The computer system of claim 7, wherein the anomaly is indicative of ransomware.

* * * * *